(12) United States Patent
Shahriari et al.

(10) Patent No.: US 12,024,163 B2
(45) Date of Patent: Jul. 2, 2024

(54) SYSTEMS AND METHODS FOR GENERATING VEHICLE ALERTS

(71) Applicant: GM GLOBAL TECHNOLOGY OPERATIONS LLC, Detroit, MI (US)

(72) Inventors: Mohammadali Shahriari, Markham (CA); Vaibhav J Lawand, Northville, MI (US); Hassan Askari, Markham (CA); Rakesh Kumar, Mississauga (CA); Ricky Lin, Etobicoke (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 251 days.

(21) Appl. No.: 17/663,069

(22) Filed: May 12, 2022

(65) Prior Publication Data
US 2023/0365124 A1 Nov. 16, 2023

(51) Int. Cl.
*B60W 30/09* (2012.01)
*B60W 30/095* (2012.01)
*B60W 40/09* (2012.01)
*G08G 1/081* (2006.01)

(52) U.S. Cl.
CPC .......... *B60W 30/09* (2013.01); *B60W 30/095* (2013.01); *B60W 40/09* (2013.01); *G08G 1/081* (2013.01); *B60W 2420/403* (2013.01); *B60W 2552/53* (2020.02); *B60W 2554/4049* (2020.02)

(58) Field of Classification Search
CPC .... B60W 30/09; B60W 30/095; B60W 40/09; B60W 2420/403; B60W 2552/53; B60W 2554/4049; B60W 30/18145; B60W 50/0097; B60W 2520/10; B60W 2540/12; B60W 2540/20; B60W 2540/223; B60W 2540/225; B60W 2556/50; B60W 30/0956; B60W 50/14; G08G 1/081; G08G 1/167
See application file for complete search history.

(56) References Cited

U.S. PATENT DOCUMENTS

2023/0322215 A1* 10/2023 Patel ..................... B60W 50/14
701/26

* cited by examiner

*Primary Examiner* — Yuen Wong
(74) *Attorney, Agent, or Firm* — Lorenz & Kopf LLC (57) ABSTRACT

Systems and methods of alerting an occupant of a vehicle to an obstacle to a side of the vehicle. The systems and methods include receiving turn indicating data from at least one vehicle system, receiving perception data from a perception system of the vehicle, predicting a vehicle turn based on the turn predicting data, generating an obstacle alert, which is output through an output device of the vehicle, when an obstacle is detected within a first sized detection zone or a second sized detection zone using the perception data, and switching from using the first sized detection zone to using the second sized detection zone for generating the obstacle alert in response to predicting the vehicle turn. The second sized detection zone is extended as compared to the first sized detection zone.

20 Claims, 5 Drawing Sheets

SYSTEMS AND METHODS FOR GENERATING VEHICLE ALERTS

The present disclosure generally relates to vehicles, systems and methods for alerting a vehicle occupant of an obstacle. In particular, the present disclosure relates to vehicles, systems and methods for performing blind spot detection.

INTRODUCTION

Vehicles include alert systems that detect objects in proximity to the vehicle and alert the driver to the object. The alerts are typically generated based on a location of the object and based on a particular driving maneuver that is or will be occurring. Such alert systems can include, but are not limited to, side blind zone alert systems, lane change alert systems, and other systems using front, side, and rear view cameras and other perception devices. Typically, sensory devices are placed and/or calibrated to detect objects within a defined area around the vehicle. For example, the defined area may be intended to encompass an adjacent lane to a side of the vehicle. If the area of coverage of a detection zone is too great, the driver may be bothered by nuisance alerts for obstacles that are not, in fact, in an adjacent lane or a collision risk with the vehicle. If the area of coverage of the detection zone is too small, particularly when turning, the driver may not be appropriately warned of an impending collision risk.

Accordingly, it is desirable to provide systems and methods that reduce nuisance alerts of a collision risk and which appropriately alerts a driver of a collision risk. Furthermore, other desirable features and characteristics of the present invention will become apparent from the subsequent detailed description and the appended claims, taken in conjunction with the accompanying drawings and the foregoing technical field and background.

SUMMARY

In one aspect, a method of alerting an occupant of a vehicle to an obstacle to a side of the vehicle. The method includes receiving, via at least one processor, turn predicting data from at least one vehicle system, receiving, via the at least one processor, perception data from a perception system of the vehicle, predicting, via the at least one processor, a vehicle turn based on the turn predicting data, generating, via the at least one processor, an obstacle alert, which is output through an output device of the vehicle, when an obstacle is detected within a first sized detection zone or a second sized detection zone using the perception data, and switching, via the at least one processor, from using the first sized detection zone to using the second sized detection zone for generating the obstacle alert in response to predicting the vehicle turn. The second sized detection zone is extended as compared to the first sized detection zone.

In embodiments, the turn predicting data includes at least one of the following types of turn predicting data: map data describing an upcoming intersection, navigation data describing an upcoming intersection, perception data describing an upcoming intersection, brake data indicating application of vehicle brakes, perception data describing absence of a lane line on one side of the vehicle, throttle data describing a throttle position resulting in slowing of the vehicle, turn signal data describing activation of a turn signal, driver monitoring data, perception data describing a laterally moving vehicle path, inertial measurement data describing lateral movement of the vehicle, speed data describing slowing of the vehicle, steering wheel angle data describing lateral movement of the vehicle, and vehicle dynamics data describing slowing or lateral movement of the vehicle.

In embodiments, the turn predicting data includes at least two of the types of turn predicting data. The at least two of the types of turn predicting data may be combined using a probabilistic algorithm that predicts a probability of the vehicle turn.

In embodiments, the output device is at least one of an audio, visual and haptic output device. The output device may be a visual output device included in a side mirror.

In embodiments, the second sized detection zone is laterally extended as compared to the first sized detection zone.

In embodiments, the method includes detecting, via the at least one processor, completion of the vehicle turn based on the turn predicting data; and switching, via the at least one processor, from using the second sized detection zone to using the first sized detection zone for generating the obstacle alert in response to detecting completion of the vehicle turn.

In embodiments, completion of the vehicle turn is based on at least one of the following types of turn predicting data: steering angle data indicating substantially straight wheels, brake data indicating reduced or completed application of vehicle brakes, throttle data describing a throttle position resulting in longitudinal acceleration of the vehicle, turn signal data describing deactivation of a turn signal, inertial measurement data describing straight movement of the vehicle, speed data describing speed or acceleration of the vehicle; and vehicle dynamics data describing longitudinal acceleration or substantially straight movement of the vehicle.

In embodiments, the vehicle system comprises at least one of: a vehicle dynamics sensor system, a navigation system, the perception system, a driver monitoring system and one or more vehicle actuator sensors.

In another aspect, a vehicle is provided. The vehicle includes an output device, a perception system, and at least one processor in operable communication with the output device and the perception system. The at least one processor is configured to execute program instructions. The program instructions are configured to cause the at least one processor to: receive turn predicting data from at least one vehicle system of the vehicle, receive perception data from the perception system, predict a vehicle turn based on the turn predicting data, generate an obstacle alert, which is output through the output device, when an obstacle is detected within a first sized detection zone or a second sized detection zone using the perception data, and switch from using the first sized detection zone to using the second sized detection zone for generating the obstacle alert in response to predicting the vehicle turn. The second sized detection zone is extended as compared to the first sized detection zone.

In embodiments, the turn predicting data includes at least one of the following types of turn predicting data: map data describing an upcoming intersection, navigation data describing an upcoming intersection, perception data describing an upcoming intersection, brake data indicating application of vehicle brakes, perception data describing absence of a lane line on one side of the vehicle, throttle data describing a throttle position resulting in slowing of the vehicle, turn signal data describing activation of a turn signal. driver monitoring data, perception data describing a laterally moving vehicle path, inertial measurement data describing lateral movement of the vehicle, speed data describing slowing of the vehicle, steering wheel angle data describing lateral movement of the vehicle, and vehicle dynamics data describing slowing or lateral movement of the vehicle.

In embodiments, the turn predicting data includes at least two of the types of turn predicting data. In one embodiment, the at least two of the types of turn predicting data are combined using a probabilistic algorithm that predicts a probability of the vehicle turn.

In embodiments, the output device is at least one of an audio, visual and haptic output device. In one embodiment, the output device is a visual output device included in a side mirror.

In embodiments, the second sized detection zone is laterally extended as compared to the first sized detection zone.

In embodiments, the program instructions are configured to cause the at least one processor to: detect completion of the vehicle turn based on the turn predicting data; and switch from using the second sized detection zone to using the first sized detection zone for generating the obstacle alert in response to detecting completion of the vehicle turn.

In embodiments, completion of the vehicle turn is based on at least one of the following types of turn predicting data: steering angle data indicating substantially straight wheels, brake data indicating reduced or completed application of vehicle brakes, throttle data describing a throttle position resulting in longitudinal acceleration of the vehicle, turn signal data describing deactivation of a turn signal, inertial measurement data describing straight movement of the vehicle, speed data describing speed or acceleration of the vehicle, and vehicle dynamics data describing longitudinal acceleration or straight movement of the vehicle.

In embodiments, the vehicle system comprises at least one of: a vehicle dynamics sensor system, a navigation system, the perception system, a driver monitoring system and one or more vehicle actuator sensors.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods described herein provide a novel probabilistic method to systematically adapt a sensing coverage range by predicting a vehicle turn. In the present disclosure, a perception sensing zone is proactively and dynamically adjusted based on different driving scenarios. In one embodiment, a Side Blind Zone Alert (SBZA) system utilizes radars with a sensing zone that is extended prior to a vehicle turn to alert a driver preemptively of any obstacle in the sensing zone. The present disclosure provides a probabilistic algorithm that explicitly predicts a host vehicle maneuvers (for example turns) using standard vehicle dynamics and active safety sensors to enable sensors on the vehicle to adjust a sensing zone with a required lead time for threat detection. The developed methodology predicts turns and radar zones are extended only during the turn and a standard zone is kept while not turning. This systems and methods enable early detection of a vulnerable road user when making turns.

Systems and methods described herein provide systems and methods that detect a driver's intention to make a turn. The methodology of vehicle turn detection described herein may use Advanced Driving Assistance System (ADAS) sensors including camera information, map information, driver inputs and vehicle dynamics sensors. In one embodiment, a combination of vehicle path parameters is used to detect a vehicle turn. Additionally, or alternatively, an upcoming turn is predicted with a set route in navigation and Global Positioning System (GPS). A detection zone of radar sensing is extended while left turning for intersection collision mitigation. A detection zone of radar sensing is expanded while turning right for vulnerable road user (e.g., bicycle and pedestrian) detection.

Figure 1:
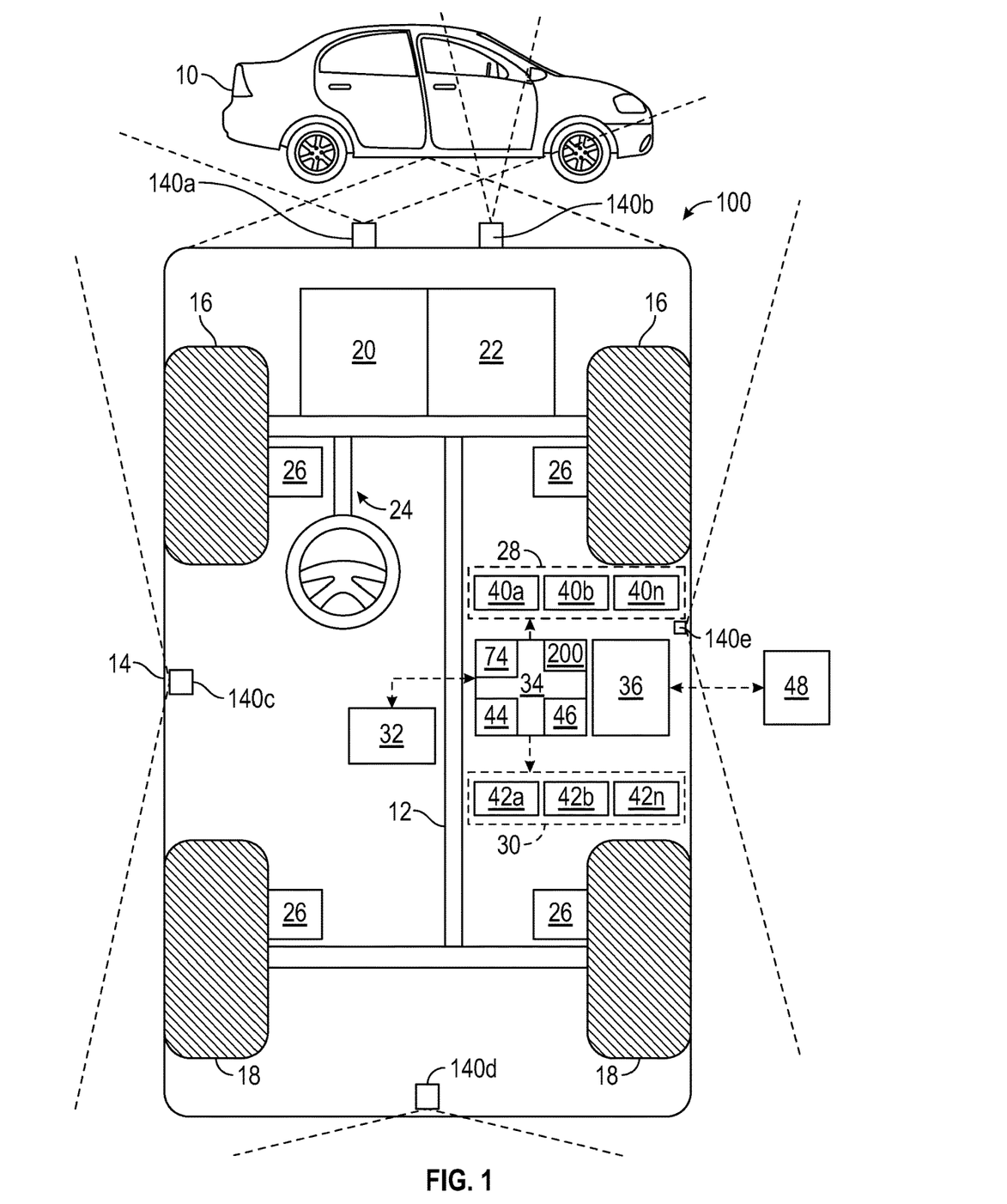
FIG. 1 is a functional block diagram illustrating an autonomous or semi-autonomous vehicle system utilizing an alerting system, in accordance with various embodiments.

With reference to FIG. 1, a vehicle system shown generally at 100 is associated with a vehicle 10 in accordance with various embodiments. In general, the vehicle system 100 includes an alerting system 200. The alerting system 200 combines information from a variety of data sources to predict a vehicle turn and expands a detection zone of a perception zone when the turn is predicted.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In some embodiments, the alerting system 200 described herein is envisaged to be used in semi-autonomous automotive vehicles or other vehicles having a perception system included in ADASs. In particular, the alerting system 200 has utility in association with ADASs such as adaptive cruise control and collision avoidance systems.

The vehicle 10 is depicted in the illustrated embodiment as a passenger car, but it should be appreciated that any other vehicle including motorcycles, trucks, sport utility vehicles (SUVs), recreational vehicles (RVs), etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18 and is associated with a steering wheel.

The sensor system 28 includes one or more sensing devices 40a-40n that sense observable conditions of the exterior environment and/or the interior environment of the vehicle 10. The sensing devices 40a-40n can include, but are not limited to, global positioning systems, perception devices 140a-140e (such as radars, lidars, thermal cameras, ultrasonic sensors, etc. but particular radars) and/or other sensors. The perception devices 140a-140e are mounted on the vehicle 10 and are arranged for capturing images (e.g. radar images) of an environment surrounding the vehicle 10. In the illustrated embodiment, there are perception devices 140c and 140e located on opposed lateral sides of the vehicle 10. In other embodiments, first and second front facing perception devices (e.g. optical cameras) are arranged for respectively imaging a wide angle, near field of view and a narrow angle, far field of view. Further illustrated is a rear camera perception device (such as an optical camera). The number and position of the various perception devices 140a-140e is merely exemplary and other arrangements are contemplated. The perception devices 140a-e are included in a perception system 74. The perception system 74 generates perception data from the perception devices 140a-e, synthesizes and processes the perception data and predicts the presence, location, classification, and/or path of objects and features of the environment of the vehicle 10. In various embodiments, the perception system 74 can incorporate information from multiple sensors, including but not limited to cameras, lidars, radars, and/or any number of other types of sensors. The perception system 74 includes perception devices 140c, 140e, which may be radar devices that generate laterally directed radar beams and detect at least positions (and optionally also velocities) of any objects that are located within a detection zone located to lateral sides of the vehicle 10. A size of the detection zone is adapted based on whether an upcoming turn is predicted.

The radar devices (e.g. side radars) included in the perception devices 140a-e may include long and/or short range radars. Further radar devices may be included that are distributed around the vehicle. The radar devices may be specifically configured for providing an input to driver assistance systems, such as adaptive cruise control and collision warning. The radar devices may be capable of detecting and recognizing objects, particularly objects located alongside (e.g. in a blind spot area) of the vehicle 10. The radar devices are suitable for providing radio frequency signals that can be used to determine a distance and/or a relative velocity of various objects with respect to the vehicle 10. The radar devices include a transmitter and a receiver or MIMO (multi-input, multi-output) radar devices are provided that include an array of transmitters and an array of receivers. The radar devices are controlled to generate a radio frequency wave front, which may be a linear frequency-modulated continuous wave (LFM-CW), often referred to as a chirp signal. Alternately, a pulsed signal or a combination of pulsed and chirp signals are generated. The radio frequency signal is reflected off of various objects in the environment of the vehicle 10. Each of these objects generates a reflected signal in response to receiving the transmitted signal. The radar devices include a processor (not shown) for transferring the reflected waves into a data format capable of analysis, indicating for example range and angle from the objects off which the waves have reflected. Further processing of the data allows velocity and position of reflecting surfaces to be revealed.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the alerting system 200 and, when executed by the processor 44, are configured to implement the methods and systems described herein for detecting objects in a detection zone using the perception devices 140a-e, predicting a vehicle turn and expanding the detection zone when the vehicle turn is predicted.

Figure 2:
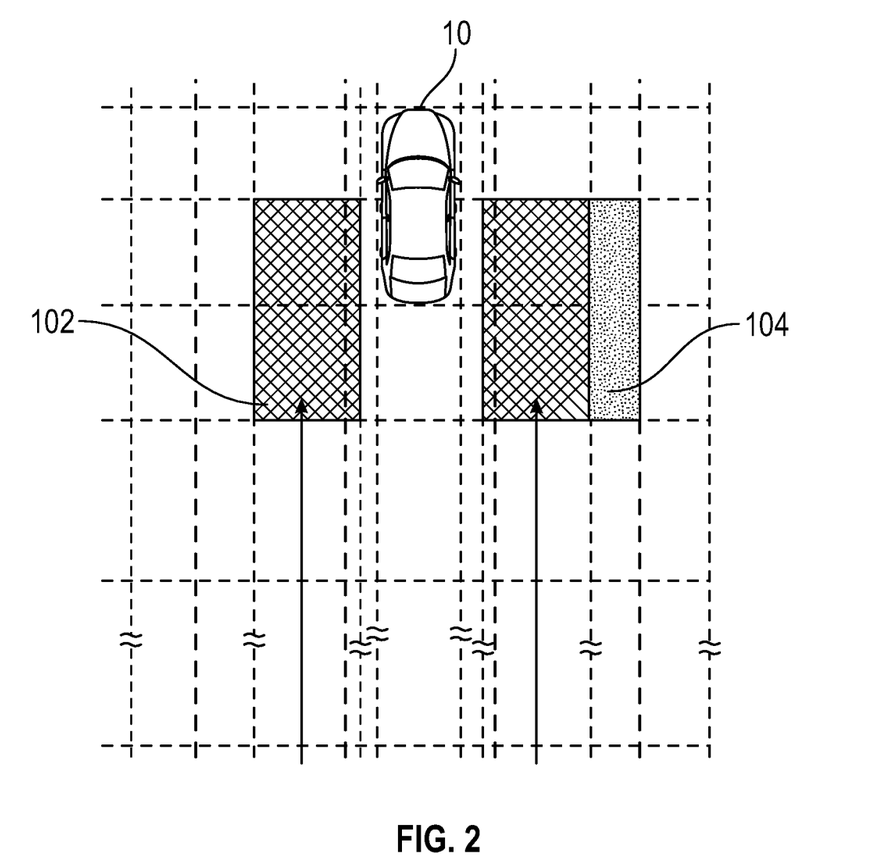
FIG. 2 is a diagram illustrating a vehicle and associated detection zones, in accordance with various embodiments.

Referring to FIG. 2, the vehicle 10 is schematically depicted in association with a normal detection zone 102 and an extended detection zone 104. The perception devices 140a-n generate perception data e.g. images of zones on opposed lateral side of the vehicle 10. When the vehicle 10 is detected to be driving straight (or is not turning and is not predicted to turn), an alert is generated by the controller 34 when an obstacle is detected in the normal detection zone 102. The alert is directional in that a left indicating alert is provided when an obstacle is detected in a left sided normal detection zone 102 and right indicating alert is provided when an obstacle is detected in a right sided normal detection zone 102. The controller 34 receives data from a variety of sources (which will be described further below) to predict that a vehicle turn is upcoming. When the vehicle turn is predicted, the detection zone is laterally expanded to the extended detection zone 104. The extension is directional in that a prediction of a right turn will result in an extension of the detection zone on a right side of the vehicle 10 and a prediction of a left turn will result in an extension of the detection zone on a left side of the vehicle 10. In this way, a lateral distance in which objects can result in alert generation is extended when a vehicle turn is predicted. The normal detection zone 102 may extend laterally (and longitudinally) a fixed predetermined distance relative to a lateral side the vehicle 10. The extended detection zone 104 may extend laterally a further fixed predetermined distance, although the longitudinal coverage may not change as compared to the normal detection zone 102.

Figure 3:
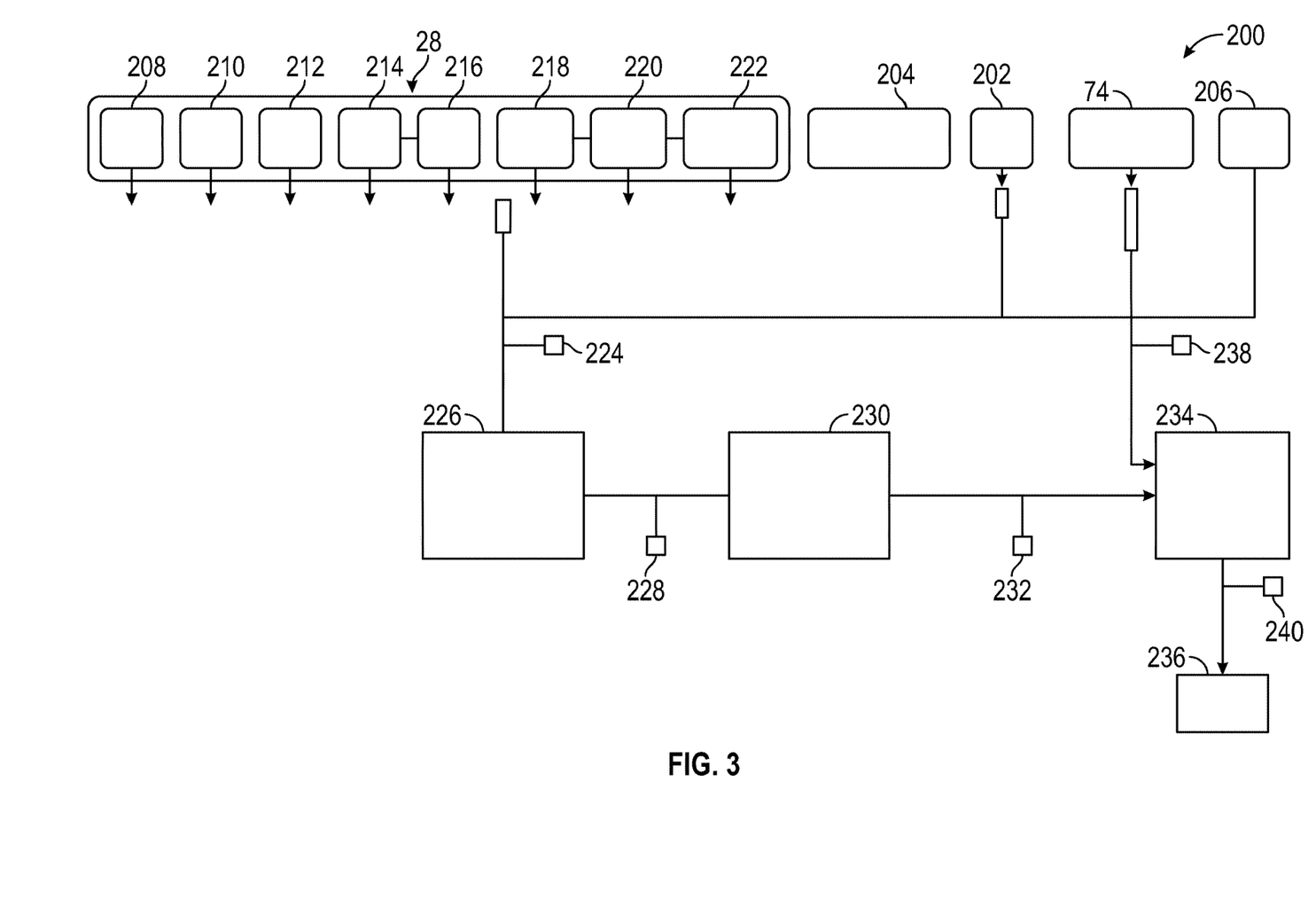
FIG. 3 is a system diagram illustrating functional blocks for an alerting system, in accordance with various embodiments.

Referring to FIG. 3, with continued reference to FIGS. 1 and 2, the alerting system 200 is further illustrated in accordance with exemplary embodiments. The alerting system 200 includes functional modules that are performed by the programming instructions described hereinbefore and other system components. The alerting system 200 includes the sensor system 28, an infotainment system 204, a Driver Monitoring System (DMS) 202, the perception system 74 and an ADAS 206.

The sensor system 28 includes one or more of the following sensors that provide data (turn predicting data 224) indicative of whether the vehicle 10 is predicted to drive substantially straight or to make a turn at an intersection. The sensor system 28 includes a steering angle sensor (SAS) 208, a wheel speed sensor (WSS) 210, an inertial measurement unit (IMU) 212, a global positioning system (GPS) 214, a transmission gear 216, an engine sensor 218, a turn signal sensor 220, a throttle and/or brake sensor 222. The SAS 208 provides data indicative of a steering wheel angle, which can provide relevant information to predicting a vehicle turn. Whilst the alerting system 200 aims to predict the vehicle turn in advance of the vehicle commencing a turn, the steering wheel angle may indicate that the driver is preparing to turn, e.g. by detecting that the vehicle 10 is veering in the direction of the turn or a steering angle profile versus time matching that of a probably upcoming turn. The WSS 210 provides a speed measurement, which can indicate an upcoming turn by a slowing speed of the vehicle 10 or the speed being below a threshold indicative of a vehicle turn or the speed following a speed versus time profile that is representative of the vehicle going into a turn. The IMU 212 can provide acceleration data indicating that the vehicle 10 is slowing and/or that the vehicle 10 has some lateral forces indicative of an upcoming turn. The data from the GPS 214 can also be processed to provide speed and acceleration data that can indicate an upcoming turn. Data from the engine sensor 218 can indicate reduced engine power or revolution rate. The turn signal sensor 220 can indicate a driver's intention to turn. The throttle/brake sensor 222 can indicate activation of the brake system 26 (e.g. by a braking actuator (e.g. a brake pedal) being actuated by a driver) and/or lowering of the throttle (e.g. by a throttle actuator (e.g. a throttle) being at least partly released by a driver).

Additional sources of turn predicting data 224 include an infotainment system 204, which includes a navigation device. The navigation device can provide map data and a localization of the vehicle 10 relative to the map. A location, and movement trend, of the vehicle 10 can indicate an upcoming intersection, which increases probability of a vehicle turn. If the navigation device is providing guidance for a route (e.g. turn by turn directions), an upcoming turn is known to the navigation device according to a generated route. Further, the navigation device can provide speed limit information, which may be combined with a vehicle speed to garner an indication of an upcoming turn.

Another source of turn predicting data 224 is the DMS 202, which may track head pose and/or eye position. A driver may move their head and/or their eyes in the direction of an upcoming turn, which can be detected by the DMS 202.

A further source of turn predicting data 224 can be the perception system 74. In particular, an intersection may be detected by analyzing image data from a forward and/or side looking optical camera. The intersection may be detected by locating a side road and/or by locating gaps in lane lines to a side of the vehicle 10. Further, a lateral offset relative to lane lines on either side of the vehicle may be detected. The lateral offset may reduce when the a turn is upcoming.

The ADAS 206 may include path planning logic for automated control of some steering functions. The path planning data can predict an upcoming turn.

The alerting system 200 includes a turn prediction module 226. The turn predicting data 224 obtained from a variety of sources (as described above) is provided as an input to the turn prediction module 226. The turn prediction module 226 implements a probabilistic framework to integrate data from multiple sources to predict an upcoming turn. In one embodiment, a Bayesian approach is used to infer probabilities of an upcoming turn based on a fusion of turn predicting data 224 collected from various sources. Other probabilistic methods for estimating probability of an upcoming turn by fusing information from the various sources of turn predicting data 224 may be used. One exemplary method for probabilistically predicting a vehicle turn is provided in the following.

The following model for turn detection of the host vehicle can be established ($X_{host,k}$):

$$\hat{X}_k = A_k X_{k-1} + B_k u_k + \varepsilon_k, \varepsilon_k \sim N(0, R_k) \quad \text{(equation 1)}$$

A measurement model can also be established:

$$Y_k = C_k X_k + \delta_k, \delta_k \sim N(0, Q_k) \quad \text{(equation 2)}$$

A Probabilistic prediction of a vehicle turn $\hat{X}_{k+f}$ can be calculated by assuming piecewise constant $A_k$ and $B_k$ and update for $A_{k+f}$ and $B_{k+f}$. This can be performed through multi-model observation.

In one embodiment, $u_k$ includes vehicle states and environmental conditions including yaw rate of host vehicle 10, steering wheel angle, driver applied torque, velocity of host vehicle, brake pedal position, vehicle transmission gear, surrounding lane markings, etc (e.g., $u_k = [\omega_z, \theta, \tau, v, p_b, l_{lt}, l_{rt}, \ldots]_k$)

$$\hat{X}_{k+1} = \hat{X}_k + g_k(Y_k - C_k(A_k X_{k-1} B_k u_k)) \quad \text{(equation 3)}$$

In one embodiment $g_k$ can be found using recursive least square as described below:

$$g_k = P_{k-1} X_k [\lambda + X_k^T P_{k-1} X_k]^{-1} \quad \text{(equation 5)}$$

The turn prediction module 226 outputs vehicle turn prediction data 228, which may be a probability value or a Boolean value indicating that the probability of an upcoming turn has been found to be greater than a set threshold. When the probability value is below a threshold, the vehicle 10 travelling longitudinally straight can be inferred. Accordingly, the vehicle turn prediction data 228 may output the vehicle turn prediction data 228 as corresponding to a turn being predicted or a straight scenario being predicted. The turn prediction module 226 may output a direction of the predicted turn (e.g. right or left) as part of the vehicle turn prediction data 228. A direction of the predicted turn can be derived by the turn prediction module 226 based on the turn predicting data 224, which includes directional components such as information from the turn signal sensor 220, information from the IMU 212, information from the GPS 214, information from the WSS 210, information from the SAS, information from the infotainment system 204, information from the DMS 202, information from the DMS 202 and information from the ADAS 206.

The alerting system 200 includes a detection zone determination module 230 that receives the vehicle turn prediction data 228. When the vehicle turn prediction data 228 changes from a straight scenario being predicted to a vehicle turn being predicted, the detection zone determination module 230 switches from the normal detection zone 102 to the extended detection zone 104. When the vehicle turn prediction data 228 changes from a vehicle turn being predicted to a straight scenario being predicted (e.g. completion of the vehicle turn), the detection zone determination module 230 switches from the extended detection zone 104 to the normal detection zone 102. The detection zone determination module 230 may output detection zone size data 232, which may be a location and position of a detection area according to the predetermined normal or extended detection zones 102, 104 or an identification of which type of detection zone has been determined (e.g. normal or extended) may be output as part of the detection zone size data 232.

The alerting system includes an alert generation module 234, which receives the detection zone size data 232 and the perception data 238 from the perception system 74. The perception data 238 may include location of object/obstacle, type of object/obstacle, velocity of object/obstacle, a track of movement of the object/obstacle, etc. The obstacle location, and optionally the further obstacle information, is assessed with respect to the normal or extended detection zone 102, 104 (whichever is elected according to the detection zone size data 232) to determine whether there is an obstacle or object in the detection zone or to determine that a trend of the obstacle or object is to move into the detection within a predetermined amount of time or to determine a collision risk with an obstacle within the detection zone. The obstacle or object may be another vehicle, a cyclist, a pedestrian, etc. The alert generation module 234 outputs an alert 240 when a positive assessment is made that an obstacle is located within the detection zone. The coverage area is extended when an upcoming turn is predicted and shrunk when the turn is completed (or otherwise when the vehicle 10 is not turning at an intersection).

The alert 240 is provided to an output device 236 of the alerting system 200. The output device 236 may be a display integrated into a dashboard of the vehicle, indicator lights provided as part of the dashboard, indicator lights provided as part of a rear view mirror, indicator lights included in side mirrors of the vehicle 10, audible alerts and/or tactile alerts (e.g. as part of a driver seat or steering wheel). The alert 240 may be directional so that a left or right location of the collision threat is indicated. This can be performed by having directional indicator lights, directionality to the displayed alert, directionality to the output sound and/or directionality to the haptic alert.

Figure 4:
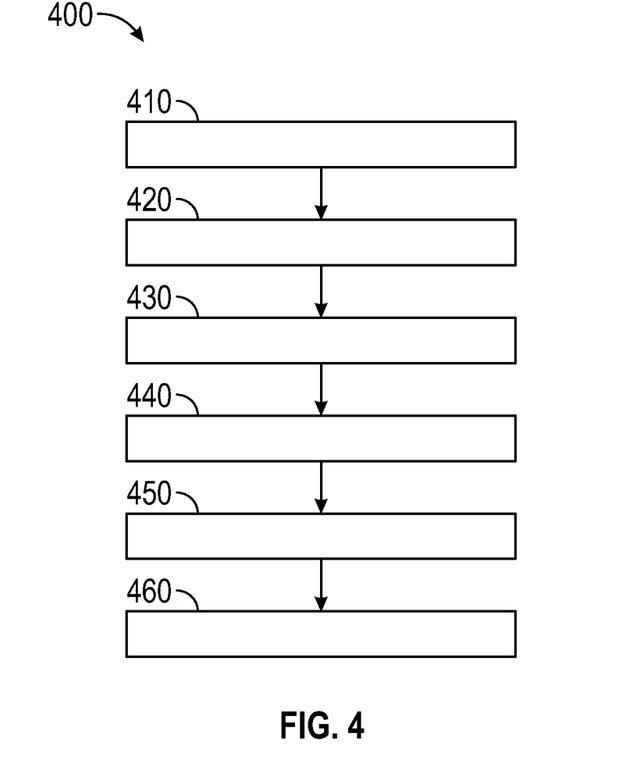
FIG. 4 is a flowchart illustrating method steps of an algorithmic process to alert a driver, in accordance with various embodiments.

Referring now to FIG. 4, and with continued reference to FIGS. 1-3, a flowchart illustrates an alerting method 400 for predicting an upcoming vehicle turn, adapting a size of a detection zone in dependence upon the prediction of the upcoming turn and assessing objects or obstacles within the adapted detection zone and generating alerts based thereon, in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the alerting method 400 can be scheduled to run based on one or more predetermined events, and/or can run continuously during operation of the vehicle 10.

The alerting method 400 may begin when wake-up conditions are fulfilled. In one embodiment, the wake-up conditions can include detection of an upcoming intersection, which can be detected based on map data provided by a map application of the infotainment system 204 and a location of the vehicle 10 provided by the GPS 214, by route navigation data provided by a navigation application of the infotainment system 204 and/or by analysis of optical images provided by the perception system 74 to identify the intersection. The wake-up conditions can include application of the brakes as detected by the throttle/brake sensor 222. The wake-up conditions can include absence of a lane being detected, by the perception system 74, on a right side of the vehicle. The wake-up conditions can include the throttle being at least partly released as detected by the throttle/brake sensor 222. These wake-up conditions can be accumulative or just one or just some of the wake-up conditions can be determined to be true for the alerting method 400 to proceed.

In step 410, the turn predicting data 224 is received. In step 420, a prediction is made as to whether an upcoming turn is probable based on the turn predicting data 224. The prediction can be based on a probabilistic assessment and fusion of turn predicting data 224 from multiple sources. For example, the turn may be predicted based on any combination of the following data elements: application of the brake and/or throttle position from the throttle/brake sensor 222; driver's head and/or eye movement from the DMS 202; the turn indictor being on or off as detected by the turn signal sensor 220; a steering wheel angle from the SAS 208; rate of change of yaw from the IMU 212; deceleration of the vehicle 10, which can be derived from data from the IMU 212, the WSS 210 or the GPS; no lane line detected or intermittent lane line detection for a set time on a side of the vehicle 10 as detected by the perception system 74. The prediction of step 420 may also provide a direction of the predicted turn (e.g. whether turning into a left or right intersection). This prediction can be part of the above described probabilistic assessment or a separate prediction step can be performed to determine directionality of the vehicle turn. Exemplary data elements for determining turn direction can include any one or more of the following: steering yaw angle from the SAS 208; vehicle heading, which can be derived from the GPS; vehicle location indicating alignment of the vehicle for a turn in a left or right direction, which can be derived from map data and vehicle localization with respect to the map; assessment of optical images from the perception system 74 indicating preparation for a left or right turn; and route information provided by a navigation system.

In step 430, a size or form of the detection zone is determined. When an upcoming turn is predicted in step 420, the detection zone is expanded from the normal detection zone 102 to the extended detection zone 104. The detection zone is extended on a side of the vehicle 10 that corresponds to the turn direction determined in step 430. Thus, the detection zone may be extended on one side and normal sized on the other side of the vehicle 10. As such, a lop-sided detection zone may be defined.

In step 440, perception data 238 is received from the perception system 74. The perception data 238 may be data from side radar devices of the vehicle providing perception coverage for at least a blind spot of the vehicle 10. Other forms of perception data 238 may be used such as optical imagery. The perception data 238 identifies at least a location of obstacles or objects, particularly moving obstacles or objects like other vehicles and cyclists. The detection zone coverage determined in step 430 is assessed in step 450 with respect to the perception data 238. In particular, a spatial congruence of the extended detection zone 104 and any perceived obstacles or objects is determined. In step 460, an alert is generated when any obstacles or objects are perceived to be within the extended detection zone 104. The alert may be directional based on which side of the vehicle 10 that a threat has been detected within the normal detection zone 102 on one side of the vehicle 10 and the extended detection zone 104 on the other side of the vehicle 10. The alert may be visual, tactile and/or audible.

The alerting method 400 may end when the vehicle 10 has been determined to have completed the turn. This determination may be made by assessing any combination of the following conditions: the steering wheel angle indicating that the wheels are substantially straight (e.g. below a threshold straightness angle); easing of brake application or throttle position going in a direction of increased throttle; the vehicle accelerating or vehicle speed being above a threshold; the turn indicator being off; and inertial motion readings indicating the vehicle 10 is travelling longitudinally straight. When the turn completion (or straight scenario) is determined, the detection zone is shrunk from the extended detection zone 104 to the normal detection zone 102 such that the alert is not generated when an obstacle or object is located within the extended detection zone 104 but is generated when an obstacle or object is located within the normal detection zone 102.

Figure 5:
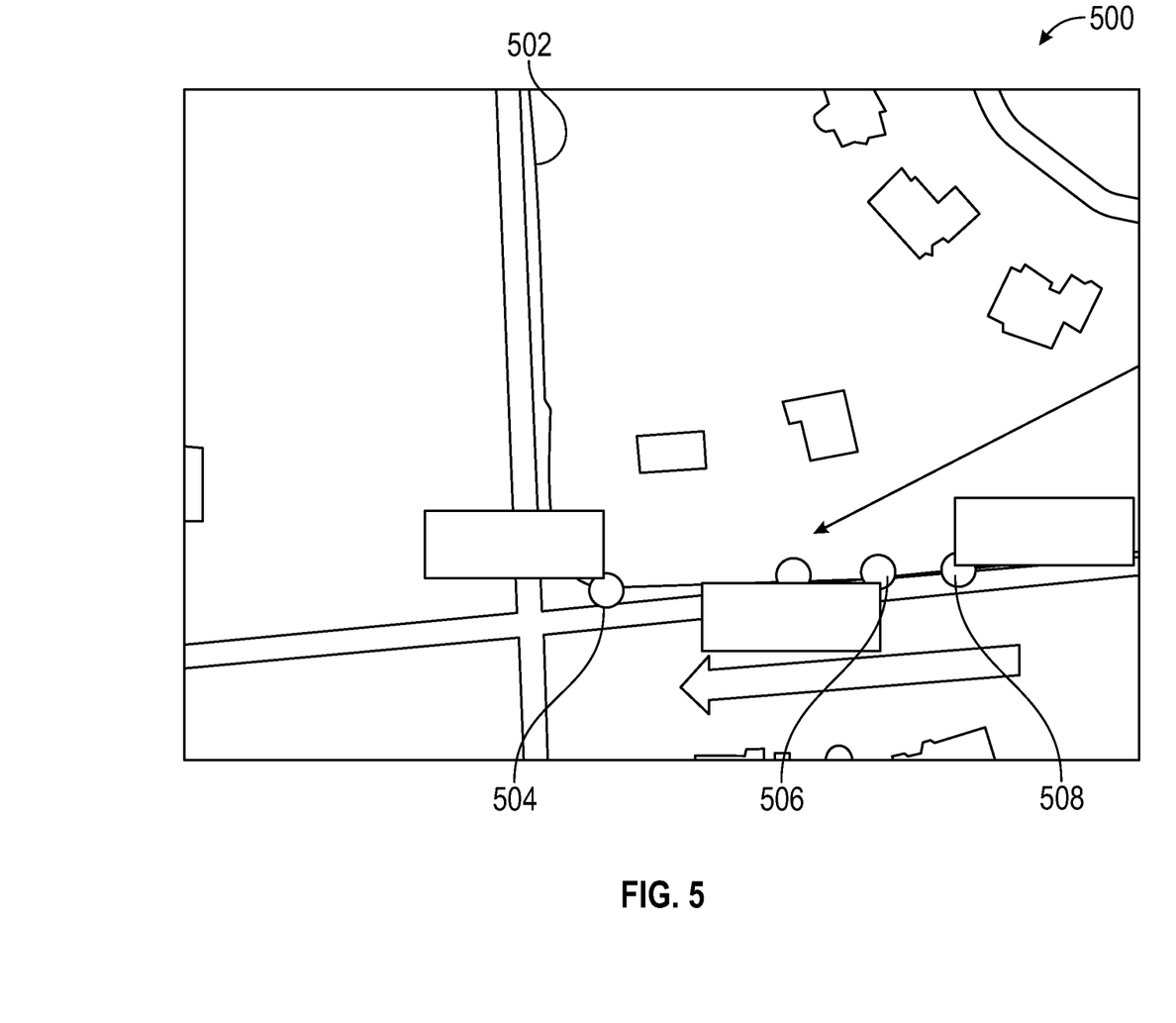
FIG. 5 is a diagram illustrating a map showing a vehicle track, in accordance with various embodiments.

FIG. 5 shows a map 500 illustrating a vehicle track 502. A vehicle is illustrated travelling along a road and leading to an intersection on a right side. At decision point 508, a driver has decided to turn at turn point 504 into an intersection on a right side of the vehicle. The present disclosure makes use of turn prediction, which allows turning of the vehicle to be predicted ahead of commencement of the turn point 504 by accumulating small indications of a driver's intention to perform an upcoming turn. As such, the detection zone can be expanded ahead of the actual turn point 504, which would not be possible with a reactive vehicle turn determination.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of alerting an occupant of a vehicle to an obstacle to a side of the vehicle, the method comprising:
    receiving, via at least one processor, turn predicting data from at least one vehicle system;
    receiving, via the at least one processor, perception data from a perception system of the vehicle;
    predicting, via the at least one processor, a vehicle turn based on the turn predicting data;
    generating, via the at least one processor, an obstacle alert, which is output through an output device of the vehicle, when the obstacle is detected within a first sized detection zone or a second sized detection zone using the perception data; and
    switching, via the at least one processor, from using the first sized detection zone to using the second sized detection zone for generating the obstacle alert in response to predicting the vehicle turn wherein the second sized detection zone is extended as compared to the first sized detection zone.

2. The method of claim 1, wherein the turn predicting data includes at least one of the following types of turn predicting data:
- map data describing an upcoming intersection;
- navigation data describing an upcoming intersection;
- perception data describing an upcoming intersection;
- brake data indicating application of vehicle brakes;
- perception data describing absence of a lane line on one side of the vehicle;
- throttle data describing a throttle position resulting in slowing of the vehicle;
- turn signal data describing activation of a turn signal;
- driver monitoring data;
- perception data describing a laterally moving vehicle path;
- inertial measurement data describing lateral movement of the vehicle;
- speed data describing slowing of the vehicle;
- steering wheel angle data describing lateral movement of the vehicle; and
- vehicle dynamics data describing slowing or lateral movement of the vehicle.

3. The method of claim 2, wherein the turn predicting data includes at least two of the types of turn predicting data.

4. The method of claim 3, wherein the at least two of the types of turn predicting data are combined using a probabilistic algorithm that predicts a probability of an upcoming vehicle turn.

5. The method of claim 1, wherein the output device is at least one of an audio, visual and haptic output device.

6. The method of claim 1, wherein the output device is a visual output device included in a side mirror.

7. The method of claim 1, wherein the second sized detection zone is laterally extended as compared to the first sized detection zone.

8. The method of claim 1, comprising detecting, via the at least one processor, completion of the vehicle turn based on the turn predicting data; and switching, via the at least one processor, from using the second sized detection zone to using the first sized detection zone for generating the obstacle alert in response to detecting completion of the vehicle turn.

9. The method of claim 8, wherein completion of the vehicle turn is based on at least one of the following types of turn predicting data:
- steering angle data indicating substantially straight wheels;
- brake data indicating reduced or completed application of vehicle brakes;
- throttle data describing a throttle position resulting in longitudinal acceleration of the vehicle;
- turn signal data describing deactivation of a turn signal;
- inertial measurement data describing straight movement of the vehicle;
- speed data describing speed or longitudinal acceleration of the vehicle; and
- vehicle dynamics data describing longitudinal acceleration or straight movement of the vehicle.

10. The method of claim 1, wherein the at least one vehicle system comprises at least one of: a vehicle dynamics sensor system, a navigation system, the perception system, a driver monitoring system and one or more vehicle actuator sensors.

11. A vehicle, comprising:
an output device;
a perception system; and
at least one processor in operable communication with the output device and the perception system, wherein the at least one processor is configured to execute program instructions, wherein the program instructions are configured to cause the at least one processor to:
receive turn predicting data from at least one vehicle system of the vehicle;
receive perception data from the perception system;
predict a vehicle turn based on the turn predicting data;
generate an obstacle alert, which is output through the output device, when an obstacle is detected within a first sized detection zone or a second sized detection zone using the perception data; and
switch from using the first sized detection zone to using the second sized detection zone for generating the obstacle alert in response to predicting the vehicle turn
wherein the second sized detection zone is extended as compared to the first sized detection zone.

12. The vehicle of claim 11, wherein the turn predicting data includes at least one of the following types of turn predicting data:
- map data describing an upcoming intersection;
- navigation data describing an upcoming intersection;
- perception data describing an upcoming intersection;
- brake data indicating application of vehicle brakes;
- perception data describing absence of a lane line on one side of the vehicle;
- throttle data describing a throttle position resulting in slowing of the vehicle;
- turn signal data describing activation of a turn signal;
- driver monitoring data;
- perception data describing a laterally moving vehicle path;
- inertial measurement data describing lateral movement of the vehicle;
- speed data describing slowing of the vehicle;
- steering wheel angle data describing lateral movement of the vehicle; and
- vehicle dynamics data describing slowing or lateral movement of the vehicle.

13. The vehicle of claim 12, wherein the turn predicting data includes at least two of the types of turn predicting data.

14. The vehicle of claim 13, wherein the at least two of the types of turn predicting data are combined using a probabilistic algorithm that predicts a probability of the vehicle turn.

15. The vehicle of claim 11, wherein the output device is at least one of an audio, visual and haptic output device.

16. The vehicle of claim 11, wherein the output device is a visual output device included in a side mirror.

17. The vehicle of claim 11, wherein the second sized detection zone is laterally extended as compared to the first sized detection zone.

18. The vehicle of claim 11, wherein the program instructions are configured to cause the at least one processor to: detect completion of the vehicle turn based on the turn predicting data; and switch from using the second sized detection zone to using the first sized detection zone for generating the obstacle alert in response to detecting completion of the vehicle turn.

19. The vehicle of claim 18, wherein completion of the vehicle turn is based on at least one of the following types of turn predicting data:
- steering angle data indicating substantially straight wheels;

brake data indicating reduced or completed application of vehicle brakes;

throttle data describing a throttle position resulting in longitudinal acceleration of the vehicle;

turn signal data describing deactivation of a turn signal;

inertial measurement data describing straight movement of the vehicle;

speed data describing speed or longitudinal acceleration of the vehicle; and vehicle dynamics data describing longitudinal acceleration or straight movement of the vehicle.

20. The vehicle of claim 11, wherein the at least one vehicle system comprises at least one of: a vehicle dynamics sensor system, a navigation system, the perception system, a driver monitoring system and one or more vehicle actuator sensors.

* * * * *